(12) United States Patent
Choi et al.

(10) Patent No.: US 10,451,835 B2
(45) Date of Patent: Oct. 22, 2019

(54) ACTUATOR OF CAMERA MODULE

(71) Applicant: SAMSUNG ELECTRO-MECHANICS CO., LTD., Suwon-si (KR)

(72) Inventors: Woo Young Choi, Suwon-si (KR); Soo Woong Lee, Suwon-si (KR); Jong Woo Lee, Suwon-si (KR); Joo Yul Ko, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 212 days.

(21) Appl. No.: 15/648,012

(22) Filed: Jul. 12, 2017

(65) Prior Publication Data

US 2018/0149828 A1    May 31, 2018

(30) Foreign Application Priority Data

Nov. 30, 2016    (KR) .......................... 10-2016-0161465

(51) Int. Cl.
*G02B 7/09*    (2006.01)
*G02B 7/105*    (2006.01)
(Continued)

(52) U.S. Cl.
CPC ............... *G02B 7/09* (2013.01); *G02B 7/105* (2013.01); *G02B 13/001* (2013.01); *G03B 3/10* (2013.01);
(Continued)

(58) Field of Classification Search
CPC . G02B 7/09; G02B 7/10; G02B 7/105; G02B 7/28; G02B 7/36; G02B 3/10;
(Continued)

(56) References Cited

U.S. PATENT DOCUMENTS

2002/0171572 A1    11/2002  Yamamoto
2007/0030939 A1*   2/2007  Gazsi .................... H03L 7/085
                                                          375/376

(Continued)

FOREIGN PATENT DOCUMENTS

JP    2002-344321 A    11/2002
JP    2009-271204 A    11/2009
(Continued)

OTHER PUBLICATIONS

Korean Office Action dated Jul. 26, 2018, in corresponding Korean Application No. 10-2016-0161465 (10 pages in English, 6 pages in Korean).

(Continued)

*Primary Examiner* — William R Alexander
*Assistant Examiner* — Ephrem Z Mebrahtu
(74) *Attorney, Agent, or Firm* — NSIP Law

(57) ABSTRACT

An actuator of a camera module includes a magnet, a coil facing the magnet, a driver configured to apply a driving signal to the coil to move the magnet in a direction, and a position estimator. The position estimator is configured to convert an oscillation signal into a digital signal in a delta sigma modulation scheme, and estimate the position of the magnet from the digital signal. A frequency of the oscillation signal varies based on a position of the magnet.

16 Claims, 5 Drawing Sheets

(51) Int. Cl.
  *G02B 3/10* (2006.01)
  *H04N 5/235* (2006.01)
  *G03B 3/10* (2006.01)
  *G02B 13/00* (2006.01)
  *H04N 5/225* (2006.01)
  *H04N 5/232* (2006.01)

(52) U.S. Cl.
  CPC ... *H04N 5/2357* (2013.01); *G03B 2205/0007* (2013.01); *G03B 2205/0038* (2013.01); *G03B 2205/0069* (2013.01); *H04N 5/2254* (2013.01); *H04N 5/2257* (2013.01); *H04N 5/23287* (2013.01)

(58) Field of Classification Search
  CPC .. G02B 27/646; H04N 5/2357; H04N 5/2354; H04N 5/23287; H04N 5/23212; H04N 5/23264; G03B 2205/0038; G03B 2205/0069; G03B 13/36; H02K 35/02
  See application file for complete search history.

(56) References Cited

U.S. PATENT DOCUMENTS

| | | | |
|---|---|---|---|
| 2009/0098834 | A1 | 4/2009 | Yoshida et al. |
| 2012/0055320 | A1* | 3/2012 | Morong ............... G01D 5/2033 84/746 |
| 2016/0295099 | A1* | 10/2016 | Kasamatsu ............ H02P 25/06 |

FOREIGN PATENT DOCUMENTS

| | | |
|---|---|---|
| JP | 4480097 B2 | 6/2010 |
| JP | 2012-177754 A | 9/2012 |
| KR | 10-2013-0077216 A | 7/2013 |
| KR | 10-2014-0088308 A | 7/2014 |

OTHER PUBLICATIONS

Park, S., "Architecture and Noise Analysis of Frequency Discriminators," Journal of IKEEE, vol. 17.3, Sep. 2013 (pp. 248-253).
Korean Office Action dated Apr. 23, 2019 in counterpart Korean Patent Application No. 10-2016-0161465 (8 pages in English and 5 pages in Korean).

\* cited by examiner

ACTUATOR OF CAMERA MODULE

CROSS-REFERENCE TO RELATED APPLICATION(S)

This application claims benefit under 35 USC 119(a) of priority to Korean Patent Application No. 10-2016-0161465, filed on Nov. 30, 2016 in the Korean Intellectual Property Office, the disclosure of which is incorporated herein by reference in its entirety.

BACKGROUND

1. Field

The following description relates to an actuator of a camera module.

2. Description of Related Art

Recently, a portable communications terminal such as a cellular phone, a personal digital assistant (PDA), a portable personal computer (PC), or similar electronic devices, has generally performed the transmission of video data and the transmission of text or audio data. In accordance with such a trend, a camera module is installed in the portable communications terminals to enable the transmission of the video data, video chatting, or the like.

Generally, the camera module includes a lens barrel including lenses disposed therein. The lens barrel is accommodated inside a housing. The housing also accommodates an image sensor to covert an image of a subject into an electrical signal. A single focus type camera module, imaging a subject by a fixed focus, may be used as the camera module. However, based on recent development of camera technology, a camera module including an actuator that enables auto-focusing has been used. In addition, camera modules that include the actuator have been used for an optical image stabilization (OIS) function to suppress a resolution decrease phenomenon due to hand-shake.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various examples include an actuator of a camera module capable of precisely detecting a position of a magnet, without using a hall sensor.

In accordance with an example, there is provided an actuator of a camera module, including: a magnet; a coil facing the magnet; a driver configured to apply a driving signal to the coil to move the magnet in a direction; and a position estimator configured to convert an oscillation signal into a digital signal in a delta sigma modulation scheme, and estimate the position of the magnet from the digital signal, wherein a frequency of the oscillation signal varies based on a position of the magnet.

The position estimator may include: a frequency divider configured to output a divided signal generated by dividing the oscillation signal by a dividing ratio based on the digital signal; and a quantizer configured to output the digital signal based on a comparison between the divided signal and a reference signal.

The reference signal and the dividing ratio may be set based on a range in which the frequency of the oscillation signal changes.

The position estimator may accumulate bit values of the digital signal during a calculation period to calculate the frequency information of the oscillation signal.

The position estimator may delay a calculation period for the digital signal per reference time to sequentially calculate the frequency information of the oscillation signal.

The position estimator may estimate the position of the magnet using position information of the magnet corresponding to frequency information of the oscillation signal.

The position estimator may include an oscillation circuit configured to generate the oscillation signal, wherein the oscillation circuit may include an inductor configured to determine the frequency of the oscillation signal.

The inductor may be disposed within a range of a magnetic field of the magnet.

A magnetic body may be disposed between the oscillation circuit and the magnet.

A magnetic body having a high magnetic permeability and coated with a magnetic material may be formed between the magnet and the oscillator circuit, in order to raise a change ratio of an inductance of the inductor based on the position of the magnet.

The position estimator may include: a converter configured to sample the oscillation signal at a frequency of a reference signal, quantize the sampled signal as a single bit, and output the quantized signal as the digital signal.

The position estimator may include: a calculator configured to receive the digital signal, and accumulate the bit values of the digital signal during a calculation period to calculate the frequency of the oscillation signal.

In accordance with an example, there is provided an actuator of a camera module including: a magnet; a coil facing the magnet; a driver configured to apply a driving signal to the coil to move the magnet in a direction; and a position estimator including an inductor, and configured to convert an oscillation signal that changed based on a position of the magnet into a digital signal, and to estimate the position of the magnet based on the digital signal, wherein a frequency of the oscillation signal may be based on an inductance of the inductor.

The position estimator may include: a frequency divider configured to output a divided signal generated by dividing the oscillation signal by a dividing ratio based on the digital signal; and a quantizer configured to output the digital signal corresponding to a comparison between the divided signal and a reference signal.

The position estimator may accumulate bit values of the digital signal during a calculation period to calculate the frequency information of the oscillation signal.

The position estimator may delay a calculation period for the digital signal per reference time to sequentially calculate the frequency information of the oscillation signal.

The position estimator may be configured to estimate the position of the magnet using position information of the magnet corresponding to frequency information of the oscillation signal.

A magnetic body having a high magnetic permeability and coated with a magnetic material may be formed between the magnet and the oscillator circuit, in order to raise a change ratio of an inductance of the inductor based on the position of the magnet.

The position estimator may include: a converter configured to sample the oscillation signal at a frequency of a reference signal, quantize the sampled signal as a single bit, and output the quantized signal as the digital signal.

The position estimator may include: a calculator configured to receive the digital signal, and accumulate the bit values of the digital signal during a calculation period to calculate the frequency of the oscillation signal.

Other features and aspects will be apparent from the following detailed description, the drawings, and the claims.

Figure 1:
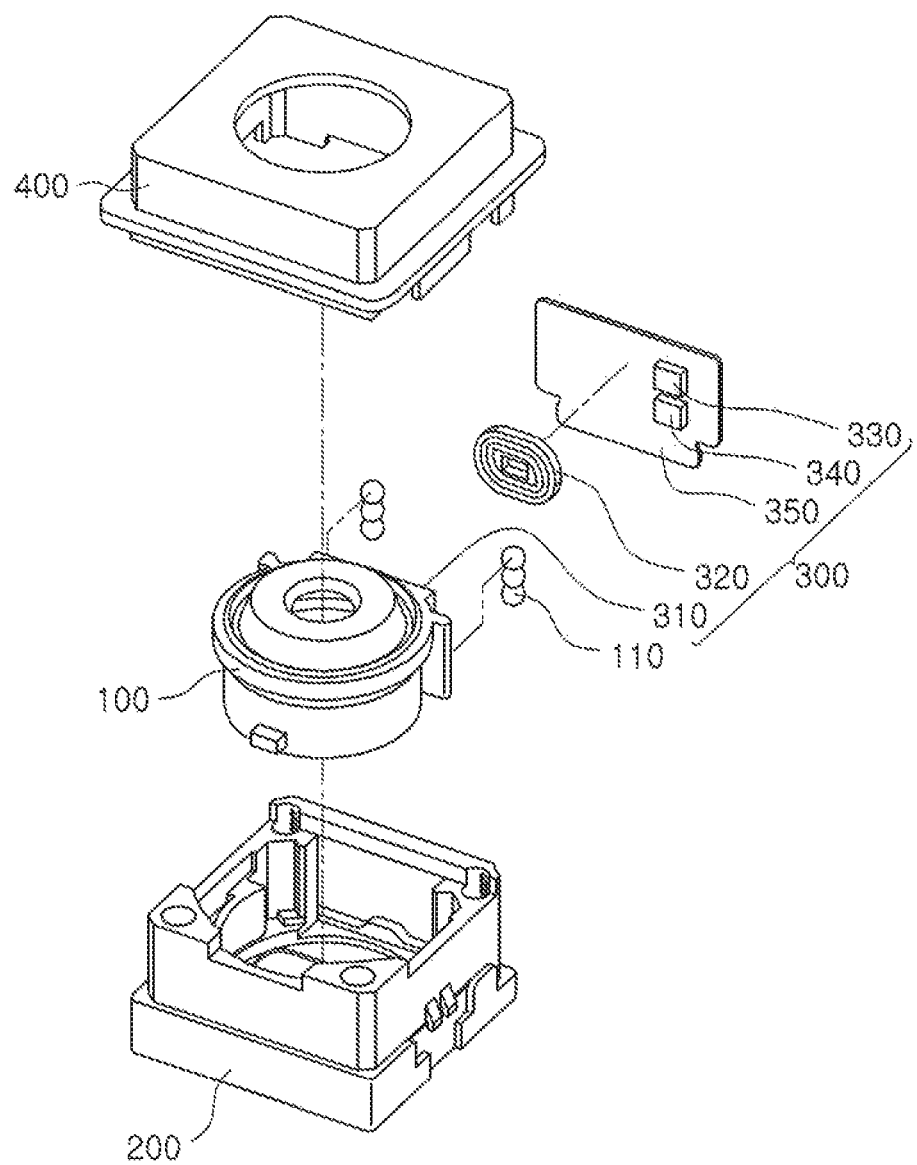
FIG. 1 is an exploded perspective view illustrating an example of a camera module.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The features described herein may be embodied in different forms, and are not to be construed as being limited to the examples described herein. Rather, the examples described herein have been provided so that this disclosure will be thorough and complete, and will convey the full scope of the disclosure after an understanding of the disclosure of this application.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

When an element is referred to as being "on," "connected to," "coupled to," or "adjacent to," another element, the element may be directly on, connected to, coupled to, or adjacent to, the other element, or one or more other intervening elements may be present.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms, including technical terms and scientific terms, used herein have the same meaning as how they are generally understood after an understanding of the disclosure of this application. Any term that is defined in a general dictionary shall be construed to have the same meaning in the context of the relevant art, and, unless otherwise defined explicitly, shall not be interpreted to have an idealistic or excessively formalistic meaning.

Identical or corresponding elements will be given the same reference numerals, regardless of the figure number, and any redundant description of the identical or corresponding elements will not be repeated. Throughout the description of the present disclosure, when describing a certain relevant conventional technology is determined to evade the point of the present disclosure, the pertinent detailed description will be omitted. Terms such as "first" and "second" can be used in describing various elements, but the above elements shall not be restricted to the above terms. The above terms are used only to distinguish one element from the other. In the accompanying drawings, some elements may be exaggerated, omitted or briefly illustrated, and the dimensions of the elements do not necessarily reflect the actual dimensions of these elements.

FIG. 1 is an exploded perspective view illustrating an example of a camera module.

Referring to FIG. 1, the camera module includes a lens barrel 100, a housing 200, an actuator 300, and a case 400.

The lens barrel 100 has a hollow cylindrical shape, so that at least one lens imaging a subject may be accommodated therein. The lens is provided in the lens barrel 100 along an optical axis. In an example, an optical axis direction refers to a vertical direction in relation to the lens barrel 100. Also, the optical axis is a line along which there is some degree of rotational symmetry in an optical system such as a camera lens or microscope. The optical axis is an imaginary line that defines the path along which light propagates through at least one lens, up to first approximation. For a lens system including lenses and mirrors, the axis passes through the center of curvature of each surface, and coincides with the axis of rotational symmetry. The optical axis is often coincident with the system's mechanical axis, but not always, as in the case of off-axis optical systems.

The lens barrel 100 is disposed in the housing 200 and is coupled to the housing 200. The lens barrel 100 moves in one direction, for instance, along the optical axis direction, within the housing 200 for the purpose of auto-focusing.

The housing 200 accommodates the lens barrel 100 therein so that the lens barrel 100 moves along the optical axis direction. Therefore, the housing 200 includes an internal space formed therein to accommodate the lens barrel 100 within the internal space. At least one ball bearing 110 is included as a guide unit to guide and enable the lens barrel to move along the optical axis direction within the lens barrel 100 within the housing. The at least one ball bearing 110 is positioned along the optical axis direction. Although FIG. 1 illustrates three ball bearings 110 to move the lens barrel 110 in the optical axis direction, a single ball bearing 110 may be implemented or more than three ball bearings 110 may be implemented, on each guide portion of the lens barrel.

At least one ball bearing 110 is disposed between the lens barrel 100 and the housing 200, and guides the movement of the lens barrel 100 in the optical axis direction through a rolling motion. At least one ball bearing 110 may be in contact with an outer surface of the lens barrel 100 and an inner surface of the housing 200 in order to guide the movement of the lens barrel 100 along the optical axis direction.

When the lens barrel 100 moves along the optical axis direction within the housing 200, at least one ball bearing 110 supports the lens barrel 100, and the lens barrel 100, thus, moves in parallel with the optical axis. The case 400 is coupled to the housing 200 to form an appearance of the camera module.

Figure 2:
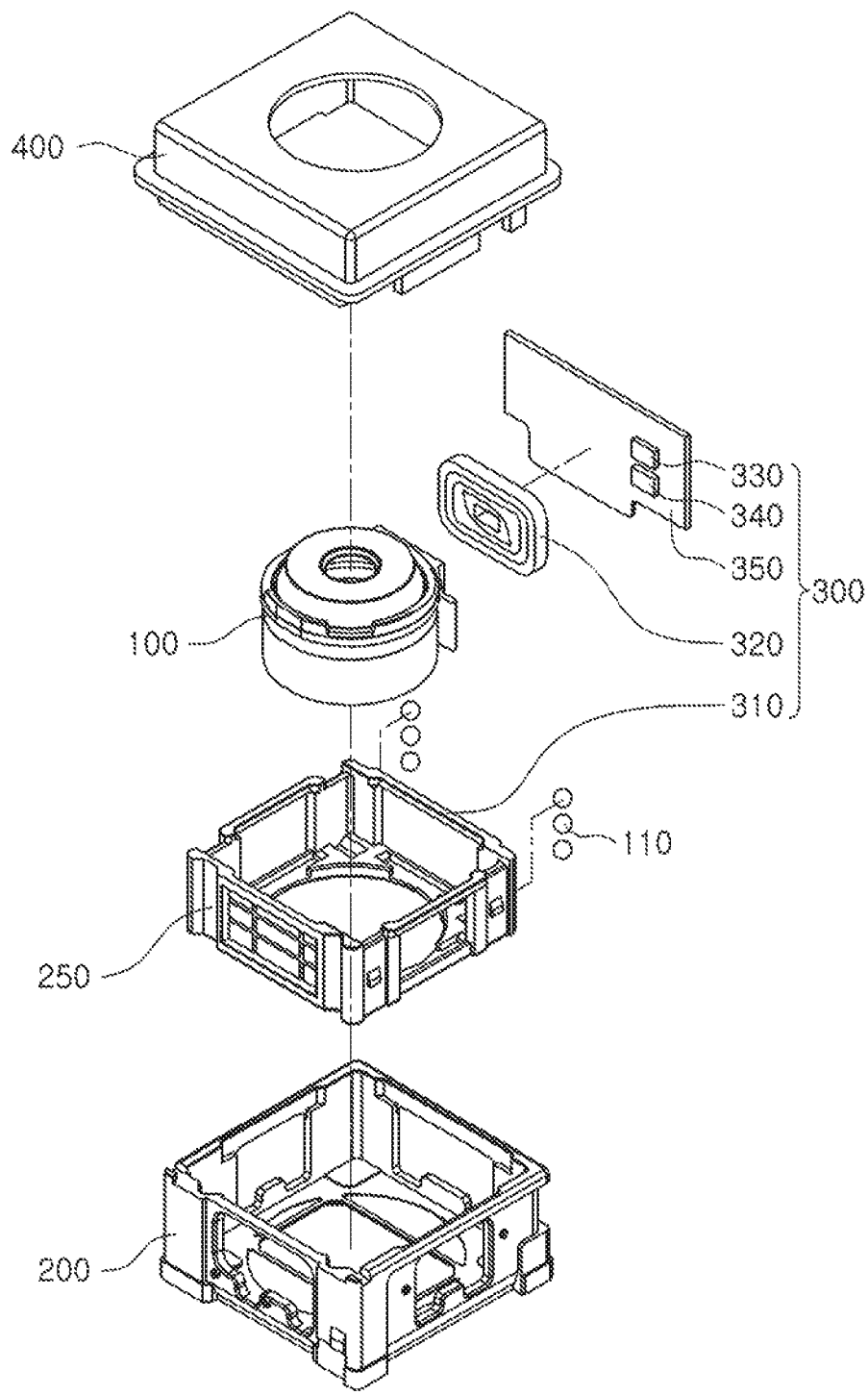
FIG. 2 is an exploded perspective view illustrating an example of a camera module.

FIG. 2 is an exploded perspective view illustrating an example of a camera module.

Referring to FIG. 2, the camera module includes a lens barrel 100, a housing 200, a holder 250, an actuator 300, and a case 400.

Because the camera module according to the example illustrated in FIG. 2 is similar to the camera module illustrated in FIG. 1, a description of contents that are the same as each other or overlap each other will be omitted, and contents that are different from each other will primarily be described.

When comparing the camera module illustrated in FIG. 1 and the camera module illustrated in FIG. 2, the camera module illustrated in FIG. 2 further includes the holder 250, accommodating the lens barrel 100 therein.

The holder 250 accommodates the lens barrel 100 therein, and moves along the optical axis direction within the housing 200. A magnet 310 is disposed on one surface of the holder 250, in order to move the holder 250 accommodating the lens barrel 100 therein in the optical axis direction.

At least one ball bearing 110 is provided in the optical axis direction on one surface of the holder 250. The ball bearing 110 guides and supports movement of the holder 250 when the holder 250 moves along the optical axis direction within the housing 200. In an alternative configuration, the at least one ball bearing 110 is disposed on one internal corner or side of the housing 200 and slides within a guiding portion of the housing 200. The at least one ball bearing 110 would support the movement of the holder 250 when the holder 250 moves in the optical axis direction within the housing 200.

The camera module illustrated in FIG. 2 is similar to the camera module illustrated in FIG. 1, except that the holder 250 accommodating the lens barrel 100 therein moves along the optical axis direction. Therefore, the camera module illustrated in FIG. 1 will be primarily described below. However, the description of FIG. 1 may also be applied to the camera module illustrated in FIG. 2.

Again referring to FIG. 1, the actuator 300 is driven so that the lens barrel 100 moves along the optical axis direction. The actuator 300 includes a magnet 310, a coil 320, a driver 330, and a position estimator 340, and a substrate 350.

The magnet 310 is disposed on one side surface of the lens barrel 100, and the coil 320 is disposed on one surface of the substrate 350 mounted in the housing 200, and faces the magnet 310. In one configuration, the substrate 350 is a flexible printed circuit board. Although not illustrated in FIG. 1, the actuator 300 may further include a yoke mounted on the other surface of the substrate 350. The yoke would prevent leakage of a magnetic flux generated between the magnet 310 and the coil 320. The magnet 310 would include two magnetic bodies polarized from each other in order to easily move the lens barrel 100. In one example, the magnetic bodies may be positioned side by side along the optical axis or, in another example, the magnetic bodies may be positioned one on top of another perpendicular to the optical axis.

The driver 330 applies a driving signal to the coil 320 to provide driving force to the magnet 310. The driving force from the magnet 310 moves the lens barrel 100 along the optical axis direction. When the driving signal is provided from the driver 330 to the coil 320, a magnetic flux is generated in the coil 320, and interacts with a magnetic field of the magnet 310 so that the magnet 310 generates the driving force.

The driver 330 may include an H-bridge circuit that may be bi-directionally driven to apply the driving signal to the coil 320 in a voice coil motor scheme.

As the driver 330 applies the driving signal to the coil 320 to generate the driving force to the magnet 310 and drive the lens barrel 100, the position estimator 340 estimates a position of the magnet 310 moved by driving of the driver 330. The position estimator 340 provides the estimated position of the magnet 310 as a feedback signal to the driver 330. Using the feedback signal, the driver 330 minutely or precisely adjusts the position of the magnet 310 by regulating an amount of current, for instance, as the driving signal to the coil 320.

The position estimator 340 detects a frequency of an oscillation signal changed based on the position of the magnet 310 to estimate the position of the magnet 310.

The driver 330 and the position estimator 340 are mounted on the substrate 350 to face the magnet 310, and the substrate 350 is secured or fixed to the housing 200. In an alternative example, the driver 330 and the position estimator 340 may be integrally formed as one integrated circuit (IC).

An example in which the driver 330 and the position estimator 340 are disposed outside the coil 320 is illustrated in FIG. 1, but the driver 330 and the position estimator 340 may also be disposed in a hollow part provided inside a center portion of the coil 320. In addition, an example in which the driver 330 and the position estimator 340 are mounted on one substrate 350 is illustrated in FIG. 1. However, in an alternative example, the driver 330 and the position estimator 340 may be separately mounted on two different substrates, and the two different substrates may be disposed on opposite surfaces of the lens barrel 100 or on same surfaces of the lens barrel 100, respectively.

Figure 3:
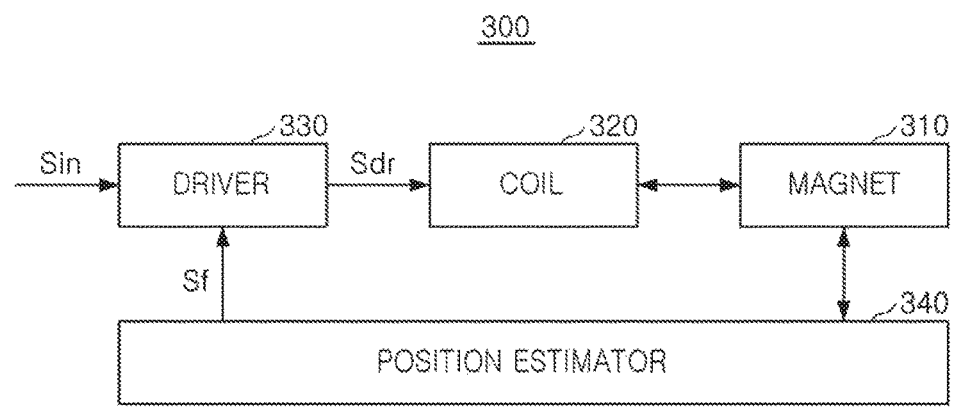
FIG. 3 is a block diagram illustrating an example of an actuator used in a camera module.

FIG. 3 is a block diagram illustrating an example of an actuator 300 used in a camera module. Hereinafter, a driving scheme of the actuator will be described in detail with reference to FIGS. 1 and 3.

The driver 330 receives an input signal Sin applied from an external source and the feedback signal Sf generated from the position estimator 340, and provides or outputs a driving signal Sdr to the coil 320.

The driver 330 outputs the driving force to the magnet 310 depending on an initial operation mode, an auto-focusing mode, or a maintaining mode. In an example, the initial operation mode corresponds to a mode to maintain an initial position of the lens barrel 100, the auto-focusing mode corresponds to a mode to move the lens barrel 100 from the initial position to a target position, and the maintaining mode corresponds to a mode to maintain the target position. The driver 330 outputs the driving force to the magnet 310 using the input signal Sin applied from the external source and the feedback signal Sf indicative of the initial operation mode, the auto-focusing mode, or the maintaining mode.

When the driving signal Sdr received from the driver 330 is applied to the coil 320, the driving force is output or provided to the magnet 310 by an electromagnetic interaction between the coil 320 and the magnet 310, and the lens barrel 100 moves in the optical axis direction through a support and guidance of the at least one ball bearing 110.

The position estimator 340 detects the position of the magnet 310 moving by the electromagnetic interaction between the magnet 310 and the coil 320 to generate the feedback signal Sf, and provides the feedback signal Sf to the driver 330. The position estimator 340 includes at least one inductor and estimates a position of the magnet 310 by converting a change in inductance as an oscillation signal of the inductor according to, corresponding to, or based on a change in position of the magnet 310 into a digital signal to estimate the position of the magnet 310. A frequency of the oscillation signal is determined based on the inductance of the inductor.

Figure 4:
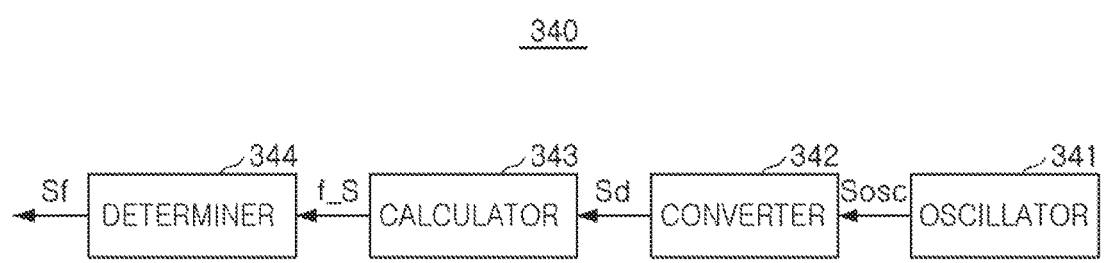
FIG. 4 is a block diagram illustrating an example of a position estimator.

FIG. 4 is a block diagram illustrating an example of a position estimator.

An operation of detecting the position of the magnet 310 by the position estimator 340 will hereinafter be described with reference to FIGS. 3 and 4.

The position estimator 340 includes an oscillator 341, a converter 342, a calculator 343, and a determiner 344.

The oscillator 341 may include an oscillation circuit to generate an oscillation signal Sosc. The oscillation circuit includes at least one inductor, one or more capacitors, and at least one resistor. As an example, the oscillation circuit includes an LC oscillator including at least one inductor and at least one capacitor, and is configured in a form such as a Colpitts oscillator. A frequency of the oscillation signal Sosc of the oscillation circuit is determined by an inductance of the inductor.

When the oscillation circuit is implemented by the LC oscillator including the inductor and the capacitor, the frequency f of the oscillation signal Sosc is represented by Equation 1. In Equation 1, l indicates an inductance of the inductor, and c indicates a capacitance of the capacitor.

$$f = \frac{1}{2\pi\sqrt{lc}}$$ [Equation 1]

As described above, the position estimator 340 is mounted on the substrate 350 (see FIG. 1) facing the magnet 310, and the oscillator 341 is, thus, disposed within a range of a magnetic field of the magnet 310. Because the oscillator 341 is disposed within the range of the magnetic field of the magnet 310, the inductance of at least one inductor of the oscillation circuit is affected by the magnetic field of the magnet 310.

In response to the magnet 310 moving by the driving force from the driver 330, a strength of the magnetic field of the magnet 310 changes, which affects the inductance of the at least one inductor of the oscillation circuit. As a result, an inductance of the inductor L changes. Therefore, the frequency of the oscillation signal Sosc output from the oscillator 341 changes based on the position of the magnet 310.

In one example, a magnetic body having a high magnetic permeability and coated with a paint formed of a magnetic material is formed between the magnet 310 and the oscillator 341, in order to raise a change ratio of the inductance of the inductor of the oscillator 341, based on the movement of the position of the magnet 310.

The converter 342 converts the oscillation signal Sosc into a digital signal Sd. The frequency of the oscillation signal Sosc is determined by the inductance of the inductor. Because the oscillation signal Sosc output from the oscillator 341 is a high frequency analog signal, when a clock signal having a frequency higher than that of the oscillation signal Sosc is used to detect the frequency of the oscillation signal Sosc, an actuator structure may become complicated, and an error may occur to determine the position of the magnet 310.

The position estimator 340 includes the converter 342 to convert the oscillation signal Sosc into the digital signal in a delta sigma modulation scheme, to precisely determine the position of the magnet 310. As an example, the converter 342 samples the oscillation signal Sosc at a frequency of a reference signal, quantizes the sampled signal as a single bit, and outputs the quantized signal as the digital signal. An example of the converter 341 will be described in more detail with reference to FIG. 5.

The calculator 343 calculates frequency information f_S of the oscillation signal Sosc, which is output from the oscillator 341. To this end, the calculator 343 may use a bit value of the digital signal Sd. As an example, the calculator 343 receives the digital signal, which is a bit stream having a bit value of 0 or 1, accumulates the bit values of the digital signal during a calculation period, and then calculates the frequency information f_S of the oscillation signal Sosc. In addition, as an example, the calculator 343 calculates an accumulated value that is generated by accumulating the bit values of the digital signal, during the calculation period, as the frequency information f_S of the oscillation signal Sosc.

The determiner 344 receives the frequency information f_S of the oscillation signal Sosc from the calculator 343, and determines the position of the magnet 310, based on the frequency information f_S of the oscillation signal Sosc. In one example, the determiner 344 includes a memory, within which position information of the magnet 310, corresponding to the frequency information f_S of the oscillation signal Sosc, is stored. In addition, upon the determiner 344 receiving the accumulated value from the calculator 343, position information of the magnet 310 corresponding to the accumulated value is stored in the memory. The memory may be implemented as a non-volatile memory including one of a flash memory, an electrically erasable programmable read-only memory (EEPROM), and a ferroelectric random access memory (FeRAM). The memory may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent after an understanding of the disclosure of this application that the computing system or computer may further include an application chipset, a camera image processor, a mobile Dynamic Random Access Memory (DRAM), or any other component suitable for inclusion in a computing system or computer. The memory controller and the flash memory device may constitute a solid-state drive or disk (SSD) that uses non-volatile memory to store data.

When the determiner 344 receives the frequency information f_S of the oscillation signal Sosc from the calculator 343, the determiner 344 determines the position of the magnet 310 based on the position information of the magnet 310 stored in the memory.

Figure 5:
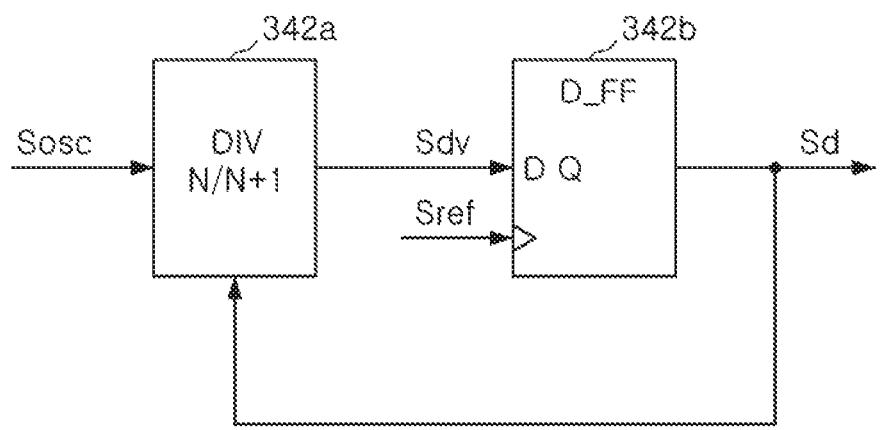
FIG. 5 is a block diagram illustrating an example of a converter.

FIG. 5 is a block diagram illustrating an example of a converter.

The converter 342 may include a frequency divider 342a and a quantizer 342b in order to convert the oscillation signal Sosc into the digital signal Sd.

The frequency divider 342a outputs a divided signal Sdv generated by dividing the oscillation signal Sosc by a dividing ratio, based on the digital signal. In addition, the frequency divider 342a receives the fed-back digital signal Sd to determine the dividing ratio. In detail, the digital signal Sd may have a bit value of 0 or 1, and the frequency divider 342a divides the oscillation signal Sosc by a dividing ratio of N or N+1, based on the bit value. As an example, the dividing ratio may be $2_t$ (where t is a positive integer).

The quantizer 342b outputs the digital signal Sd, which is a comparison result between the divided signal Sdv and a reference signal Sref, and the digital signal Sd is provided as a feedback signal to the frequency divider 342a. As an example, as illustrated in FIG. 5, a D flip-flop is used as the quantizer 342b.

Furthermore, the reference signal Sref and the dividing ratio N or N+1 may be set or defined based on a range in which the frequency of the oscillation signal changes. The frequency of the oscillation signal Sosc is determined by the inductance of the inductor, which changes based on the position of the magnet 310. Because a movement range of the magnet 310 is limited, the range in which the frequency F_Sosc of the oscillation signal Sosc changes is determined. A frequency F_Sref of the reference signal Sref and the dividing ratio N or N+1 is set or defined to satisfy Equation 2, based on the range in which the frequency F_Sosc of the oscillation signal Sosc is changed.

$$N \times F\_Sref < F\_Sosc < (N+1) \times F\_Sref \quad [2]$$

In response to the frequency F_Sref of the reference signal Sref being close to N×F_Sref, an average of bit values of the digital signal Sd output by the quantizer 342b may be approximately 0. Further, in response to the frequency F_Sref of the reference signal Sref being close to (N+1)× F_Sref, an average of bit values of the digital signal Sd output by the quantizer 342b may be approximately 1.

A frequency discriminator implemented in a primary delta sigma modulation scheme is illustrated as an example of the converter 342 in FIG. 5, but the converter 342 may be implemented in a high-order delta sigma modulation scheme to reduce noise in a signal band.

Therefore, the actuator includes the converter 342, converting the oscillation signal Sosc into the digital signal in the delta sigma modulation scheme, in order to calculate the frequency of the oscillation signal Sosc to, thus, precisely calculate the frequency of the oscillation signal Sosc. The actuator may be manufactured by a digital process in which the number of analog elements is significantly reduced.

Figure 6:
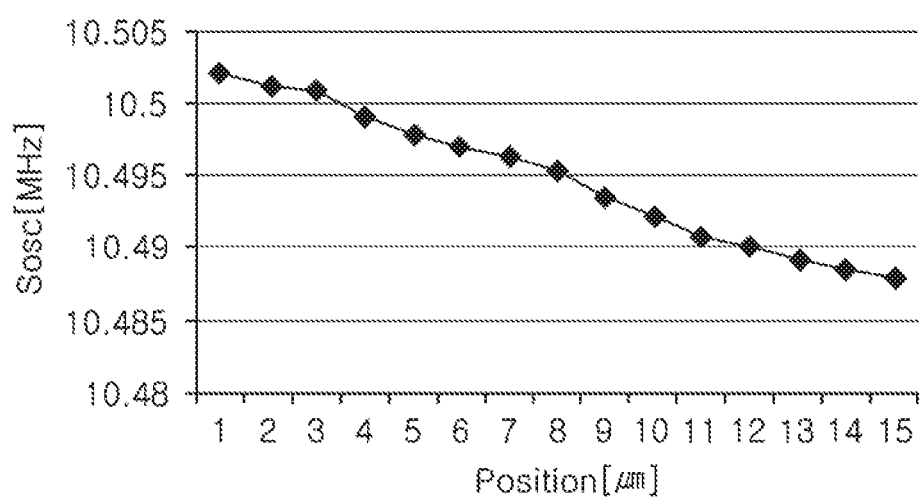
FIG. 6 is a graph illustrating data regarding position information of a magnet, corresponding to a frequency of an oscillation signal, according to an example.
Figure 7:
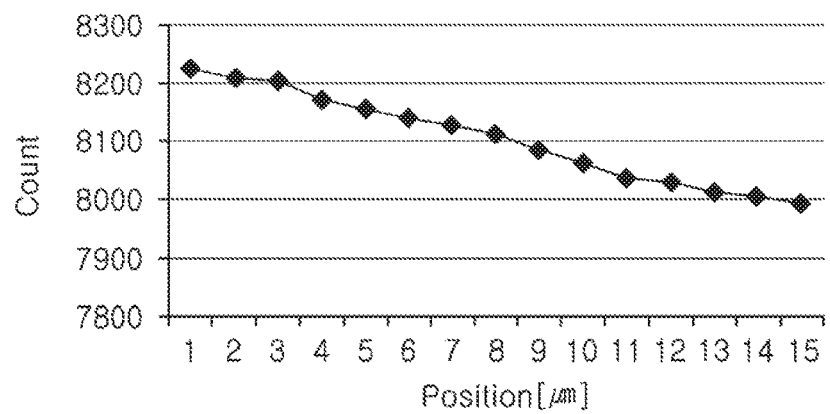
FIG. 7 is a graph illustrating data regarding position information of a magnet, corresponding to an accumulated value of a digital signal, according to an example.

FIG. 6 is a graph illustrating data regarding position information of a magnet, corresponding to a frequency of an oscillation signal according to an example, and FIG. 7 is a graph illustrating data on position information of a magnet, corresponding to an accumulated value of a digital signal according to an example.

Referring to FIG. 6, it may be appreciated that the frequency of the oscillation signal Sosc is reduced as the magnet 310 moves. For instance, the frequency of the oscillation signal Sosc changes in a range of approximately 10.502 [MHz] to 10.488 [MHz], as the magnet 310 moves in a range of approximately 1 [μm] to 15 [μm].

Referring to FIG. 7, an accumulated value Count generated by accumulating bit values of the digital signal output by the converter 342 (see FIG. 5) is output while following the frequency of the oscillation signal Sosc as the magnet 310 moves in a range of approximately 1 [μm] to 15 [μm].

Figure 8:
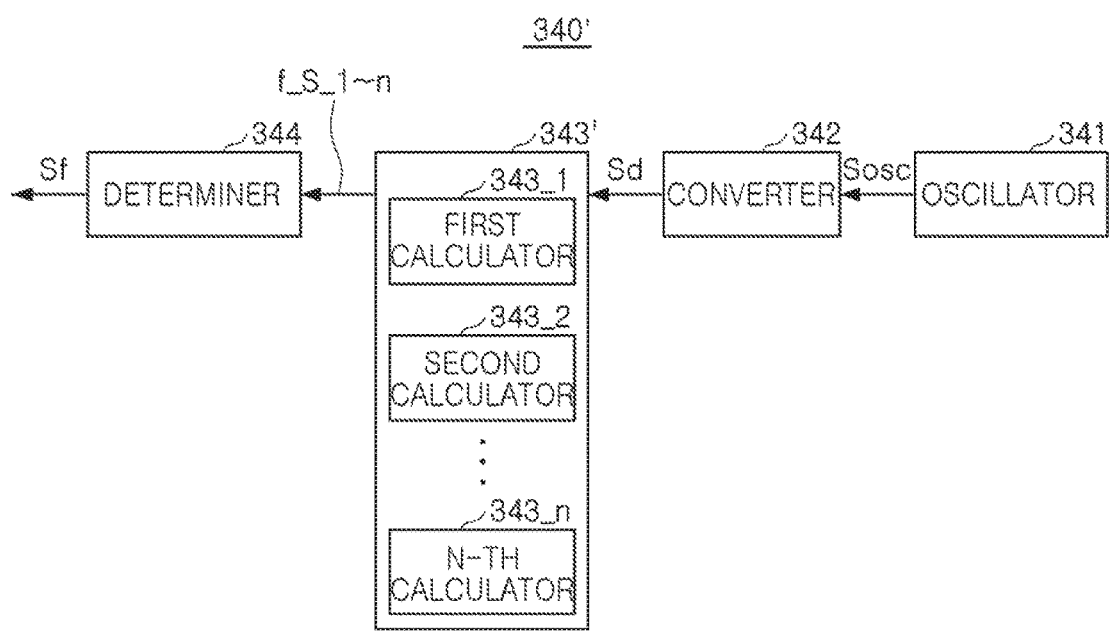
FIG. 8 is a block diagram illustrating another example of a position estimator.

FIG. 8 is a block diagram illustrating another example of a position estimator.

An operation of detecting the position of the magnet 310 by the position estimator 340' will hereinafter be described in detail with reference to FIGS. 3 and 8.

The position estimator 340' includes an oscillator 341, a converter 342, a calculator 343', and a determiner 344.

Because the position estimator 340', illustrated in FIG. 8, is similar to the position estimator 340 illustrated in FIG. 4, a description of contents that are the same as each other or overlap each other will be omitted, and contents that are different from each other will primarily be described. When comparing the position estimator 340 illustrated in FIG. 4 with the position estimator 340' illustrated in FIG. 8, the calculator 343' of the position estimator 340' illustrated in FIG. 8 may further include a plurality of calculators 343_1 to 343_n.

The calculator 343' calculates frequency information f_S using a digital signal Sd, output by the converter 342 during a calculation period, and each of the plurality of calculators 343_1 to 343_n sequentially delays a point in time of one calculation period for the digital signal Sd per predetermined reference time, to calculate frequency information f_S_1 to n of a divided signal Sdm.

For example, a first calculator 343_1 accumulates bit values of the digital signal Sd for one calculation period at one measuring point in time, and calculates frequency information f_S_1 of the oscillation signal Sosc. A second calculator 343_2 accumulates bit values of the digital signal Sd for one calculation period at a point in time delayed from one measuring point in time by a reference time, and calculates frequency information f_S_2 of the oscillation signal Sosc. In addition, an n-th calculator 343_n accumulates bit values of the digital signal Sd for one calculation period at a point in time delayed from one measuring point in time by an n−1-th reference time, and calculates frequency information f_S_n of the oscillation signal Sosc.

The determiner 344 receives the frequency information f_S_1 to n of the oscillation signal Sosc from the calculator 343', and determines the position of the magnet 310, based on the frequency information f_S_1 to n of the oscillation signal Sosc.

According to an example, the determiner 344 sequentially determines precise positions of the magnet 310, using the frequency information f_Sdm_1 to n of the oscillation signal Sosc, which is calculated during a calculation period at a plurality of measuring points in time.

According to an example, the position of the magnet is detected using the oscillation circuit, without using a separate hall sensor. As a result, a manufacturing cost of the actuator of a camera module is reduced and space efficiency of the actuator of a camera module is improved.

As set forth above, the camera module and the actuator thereof may precisely detect the position of the magnet using the digital signal.

Further, the actuator of a camera module does not use a separate hall sensor, such that a manufacturing cost of the actuator of a camera module is effectively reduced and space efficiency of the actuator of a camera module is improved.

The determiner 344, the position estimator 340, the calculator 343, and the first through N-th calculators 343_1 through 343_n in FIGS. 3-5 and 8 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application.

The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator of a camera module, comprising:
   a magnet;
   a coil facing the magnet;
   a driver configured to apply a driving signal to the coil to move the magnet in a direction; and
   a position estimator configured to convert an oscillation signal into a digital signal in a delta sigma modulation scheme, sequentially calculate frequency information of the oscillation signal by sequentially delaying a point in time of a calculation period for the digital signal per reference time, and estimate the position of the magnet based on the frequency information, wherein a frequency of the oscillation signal varies based on a position of the magnet.

2. The actuator of claim 1, wherein the position estimator comprises:
   a frequency divider configured to output a divided signal generated by dividing the oscillation signal by a dividing ratio based on the digital signal; and
   a quantizer configured to output the digital signal based on a comparison between the divided signal and a reference signal.

3. The actuator of claim 2, wherein the reference signal and the dividing ratio are set based on a range in which the frequency of the oscillation signal changes.

4. The actuator of claim 1, wherein the position estimator is configured to accumulate bit values of the digital signal during the calculation period to calculate the frequency information of the oscillation signal.

5. The actuator of claim 1, wherein the position estimator is configured to estimate the position of the magnet using position information of the magnet corresponding to the frequency information of the oscillation signal.

6. The actuator of claim 1, wherein the position estimator comprises
   an oscillation circuit configured to generate the oscillation signal, wherein the oscillation circuit comprises an inductor configured to determine the frequency of the oscillation signal.

7. The actuator of claim 6, wherein the inductor is disposed within a range of a magnetic field of the magnet.

8. The actuator of claim 1, wherein the position estimator comprises:
  a converter configured to sample the oscillation signal at a frequency of a reference signal, quantize the sampled signal as a single bit, and output the quantized signal as the digital signal.

9. The actuator of claim 8, wherein the position estimator comprises:
  a calculator configured to receive the digital signal, and accumulate the bit values of the digital signal during the calculation period to calculate the frequency information of the oscillation signal.

10. An actuator of a camera module comprising:
  a magnet;
  a coil facing the magnet;
  a driver configured to apply a driving signal to the coil to move the magnet in a direction; and
  a position estimator comprising an inductor and a converter configured to convert an oscillation signal that changed based on a position of the magnet into a digital signal, and configured to sequentially calculate frequency information of the oscillation signal by sequentially delaying a point in time of a calculation period for the digital signal per reference time and estimate the position of the magnet based on the frequency information, wherein a frequency of the oscillation signal is based on an inductance of the inductor.

11. The actuator of claim 10, wherein the position estimator comprises:
  a frequency divider configured to output a divided signal generated by dividing the oscillation signal by a dividing ratio based on the digital signal; and
  a quantizer configured to output the digital signal corresponding to a comparison between the divided signal and a reference signal.

12. The actuator of claim 10, wherein the position estimator is configured to accumulate bit values of the digital signal during the calculation period to calculate the frequency information of the oscillation signal.

13. The actuator of claim 10, wherein the position estimator is configured to estimate the position of the magnet using position information of the magnet corresponding to the frequency information of the oscillation signal.

14. The actuator of claim 10, wherein the position estimator comprises:
  a converter configured to sample the oscillation signal at a frequency of a reference signal, quantize the sampled signal as a single bit, and output the quantized signal as the digital signal.

15. The actuator of claim 14, wherein the position estimator comprises:
  a calculator configured to receive the digital signal, and accumulate the bit values of the digital signal during the calculation period to calculate the frequency information of the oscillation signal.

16. The actuator of claim 1, wherein the position estimator comprises:
  a first calculator configured to accumulate first bit values of the digital signal for a first calculation period at a first measuring point in time, and to calculate first frequency information of the oscillation signal based on the first bit values; and
  a second calculator configured to accumulate second bit values of the digital signal for a second calculation period at a second measuring point in time delayed from the first measuring point in time by the reference time, and to calculate second frequency information of the oscillation signal based on the second bit values,
  wherein the position estimator is configured to output the first frequency information and the second frequency information as the frequency information.

* * * * *